US006804504B1

(12) United States Patent
Johnson et al.

(10) Patent No.: US 6,804,504 B1
(45) Date of Patent: Oct. 12, 2004

(54) AUDIO PROCESSING SYSTEM

(75) Inventors: John D. Johnson, Louisville, KY (US); Patrick B. Mullaney, Louisville, KY (US); Robert A. Ponto, Louisville, KY (US); Brian E. Flinn, Louisville, KY (US)

(73) Assignee: Innovative Electronic Designs, Inc., Louisville, KY (US)

( * ) Notice: Subject to any disclaimer, the term of this patent is extended or adjusted under 35 U.S.C. 154(b) by 0 days.

(21) Appl. No.: 10/226,663

(22) Filed: Aug. 23, 2002

(51) Int. Cl.[7] .................................................. H04B 1/06

(52) U.S. Cl. ....................... 455/344; 455/301; 381/394; 381/395

(58) Field of Search ............................. 455/414.1, 216, 455/221, 300, 301, 344; 381/394, 395, 189, 322, 365, 94.2

(56) References Cited

U.S. PATENT DOCUMENTS 5,469,508 A * 11/1995 Vallier ......................... 381/63
5,848,146 A 12/1998 Slattery
5,862,063 A * 1/1999 Thome et al. .............. 708/290
5,983,192 A 11/1999 Botzko et al.
6,072,796 A * 6/2000 Christensen et al. ........ 370/379
6,151,397 A 11/2000 Jackson, Jr. II et al.
6,154,161 A 11/2000 Leme et al.
6,163,647 A 12/2000 Terashima et al.
6,226,758 B1 * 5/2001 Gaalaas et al. ............. 713/600
6,275,239 B1 * 8/2001 Ezer et al. .................. 345/473
6,278,678 B1 * 8/2001 Iida ............................. 369/83
2002/0082732 A1 * 6/2002 Suyama et al. ............... 700/94

FOREIGN PATENT DOCUMENTS

EP 0848383 A2 6/1998

* cited by examiner

*Primary Examiner*—Tony T. Nguyen
(74) *Attorney, Agent, or Firm*—Greenebaum Doll & McDonald PLLC; James C. Eaves, Jr.; Alexander P. Brackett

(57) ABSTRACT

The instant invention provides a digital audio processing system that includes a mainframe chassis, a central processor card, a plurality of analog input cards, and a plurality of analog output cards for accepting a plurality of audio inputs and producing a plurality of mixed audio outputs.

13 Claims, 19 Drawing Sheets

AUDIO PROCESSING SYSTEM

FIELD OF THE INVENTION

The present invention is related to electronic audio distribution systems that accept a plurality of audio inputs from sources such as microphones and produce a plurality of audio outputs representative of a mixed audio signal.

BACKGROUND

Public address and sound systems often employ multiple input audio systems to accept and process multiple audio inputs to produce a combined output signal. Prior art multiple input systems accept audio inputs from microphones, musical instruments, amplifier outputs and the like and produce a combined output that is then distributed to a plurality of speakers for broadcast. These systems are particularly advantageous for use in large areas such as meeting halls, concert venues, boardrooms, airport terminals, and train and bus stations.

Some prior art signal processing systems employ various signal attenuation arrangements whereby the signal output from the system is attenuated based on the number of active signal inputs to avoid undesirable distortion and/or feedback effects. Many prior art attenuation systems produce a reference signal derived from sensing the ambient noise level in an area proximate the sound system. This reference signal is then compared to an audio input source to determine whether that audio source should be activated as an input to the system. Furthermore, some prior art systems employ circuitry arrangements whereby the total gain of the system remains constant at all times.

Furthermore, many prior art systems employ various gating mechanisms to turn on audio input sources when an audio signal is present that is desirable to amplify, while gating the source input off when only ambient or background noise is present. Many of these prior art gating mechanisms often clip or cut off the beginning of the audible input, because the systems do not discriminate between desirable and undesirable inputs quickly enough.

Additionally, many signal processing systems accept a plurality of analog signal sources for processing using digital circuitry. The incoming analog signals are digitized and processed according to a plurality of programmable or configurable system parameters, whereupon the resultant digital outputs are converted back into analog signals to drive various sound transducers such as loudspeakers. The vast majority of these prior art systems suffer from crosstalk and system noise as a result of the commingling of analog and digital signal data. Furthermore, many prior art devices are limited in their ability to accept low-level audio input signals such as microphone inputs due to the noise floor of the system. Techniques for reduction of system noise are typically limited to enhanced shielding of signals to reduce noise throughout.

SUMMARY OF THE INVENTION

The instant invention obviates the aforementioned problems by providing a digital signal processing system having multiple analog audio signal inputs and outputs for providing distributed audio to a user-defined broadcast environment. The system is configurable and adaptable for use in a wide variety of audio mixing applications, from conference rooms, to boardrooms, to large venues. A mainframe chassis that may be mounted in a standard electronics equipment rack is provided having a plurality of slots therein to house a plurality of printed circuit board cards. The chassis includes a backplane that transmits digital signals between the component cards installed in the chassis slots.

The system includes a central processor card having a microprocessor with associated memory that accepts system software instructions and communicates with the other component cards in the system. The central processor card further includes a plurality of on-board digital signal processors and associated multi-port memory for handling all system audio data processing. The multi-port memory allows sharing of data between a plurality of the digital signal processors in the system, thereby providing for efficient parallel processing.

A plurality of analog input cards are used to accept analog audio signals from various sources throughout the application environment. While most audio inputs are conventional microphone signals, the input cards may be configured to accept signals from a variety of audio sources. The analog input cards further include analog to digital converters electronics thereon to convert the analog input signals to a digital data representation.

Additionally, a plurality of analog output cards are employed to produce mixed audio outputs to drive, for example, a plurality of speakers in a venue. The analog output cards include digital to analog converters to convert processed (mixed) digital output to an analog output suitable for sound reproduction. Furthermore, the analog output cards are configurable to permit line level, line driver or amplifier analog output signals.

In addition to the central processing card, both the analog output and input cards include on-board microprocessors and digital signal processors that communicate on a plurality of system busses through the chassis backplane. The digital signal processors on the central processing card are capable of transmitting and receiving data to and from the multi-port memory thereon. This sharing of data memory is made particularly efficient by a data memory page-swapping technique that enables efficient throughput of all audio data, even when operated on by digital signal processors on a plurality of system cards.

The invention provides the ability for a user to configure the system to accept and produce a plurality of inputs and outputs respectively, and permits a user to program various audio processing objects such as mixers, compressors, limiters, and equalizers to name a few. The audio objects are processed by the signal processors resident in the system to produce a resultant audio output or outputs with minimal propagation delays.

Additionally, the unique configuration of the analog input and output cards and the orientation of the chassis backplane permit complete isolation of analog and digital signals in the system, thereby greatly reducing noise and cross-talk.

Therefore, it is an object of the present invention to provide an electronic system for processing audio input signals and producing mixed audio output signals.

It is a further object of the invention to provide a digital audio processor having a plurality of analog inputs and outputs.

It is a further object of the invention to provide a digital audio processor having complete separation of digital and analog signals therein.

It is a further object of the invention to provide a digital audio processor having minimal signal propagation delays from input to output.

Other objects and advantages of the instant invention will be apparent after reading the detailed description of the preferred embodiments, taken in conjunction with the accompanying drawing figures.

DETAILED DESCRIPTION OF THE PREFERRED EMBODIMENT(S)

Figure 1:
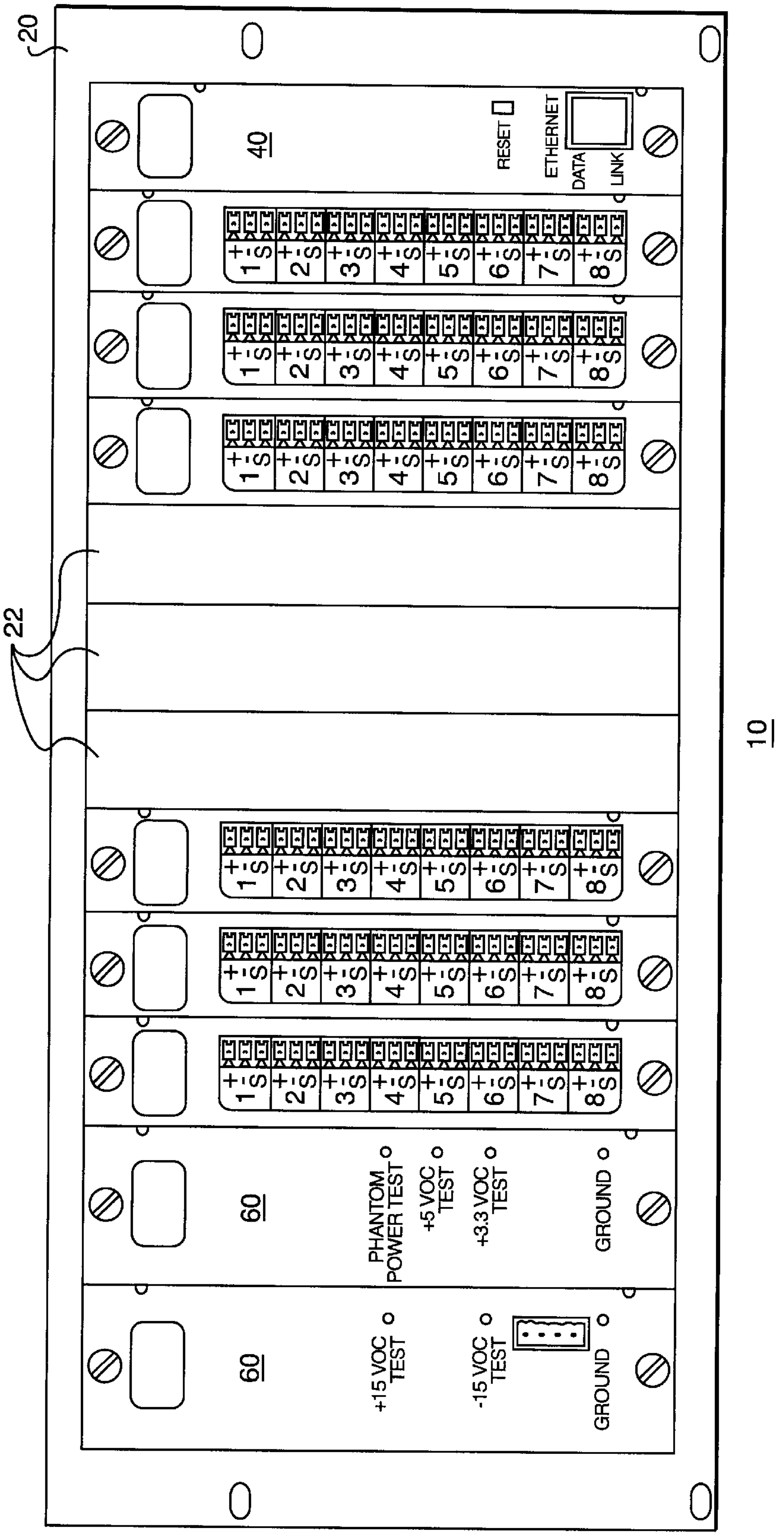
FIG. 1 is a rear view of the instant invention as installed in an equipment rack.
Figure 2:
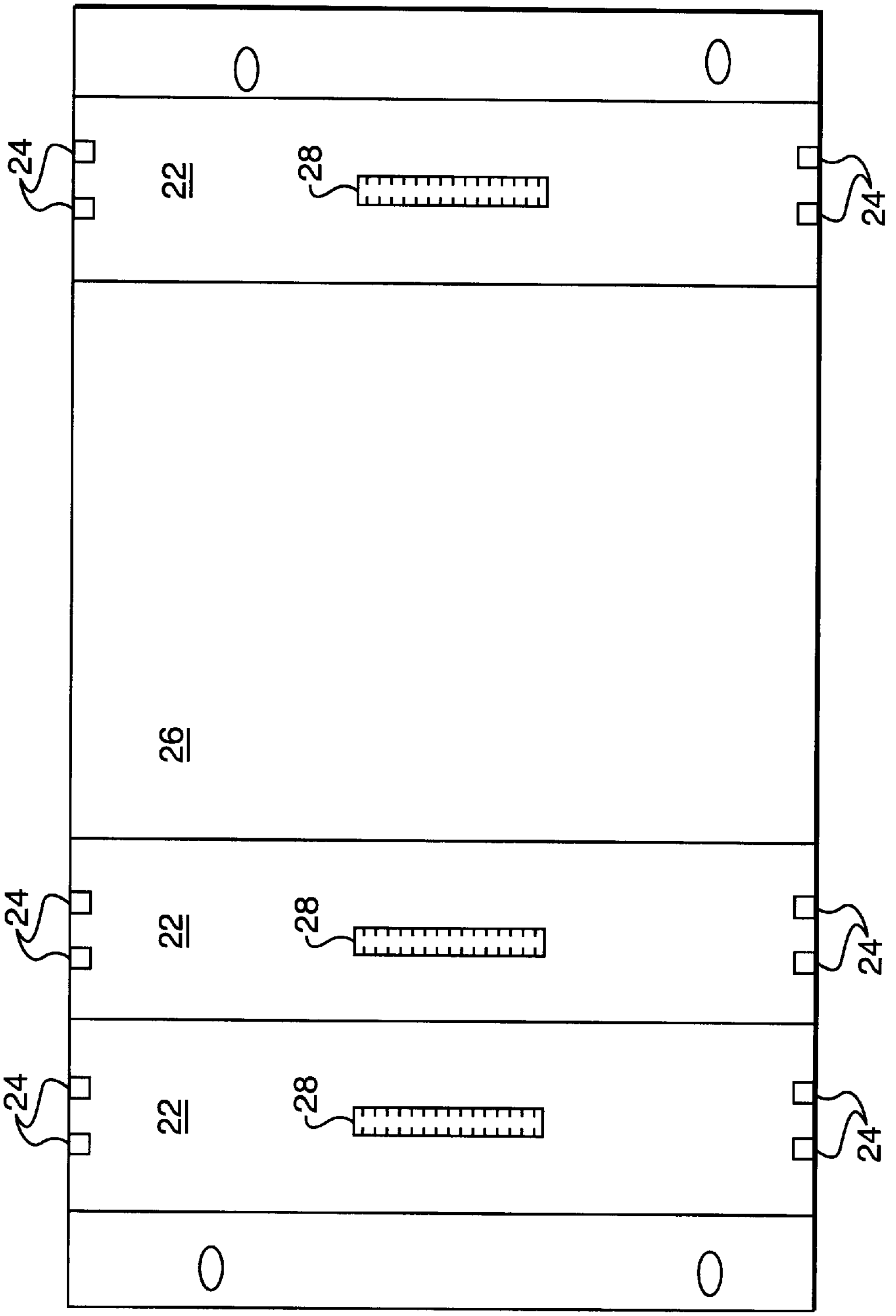
FIG. 2 is a view of a chassis in accordance with the instant invention.

Referring now to drawing FIGS. 1 and 2, and in accordance with a preferred constructed embodiment of the instant invention, a digital signal processing system 10 for use in an environment requiring distributed audio processing comprises a main frame chassis 20 having a plurality of slots 22 therein for receiving and securing a plurality of printed circuit board cards. Each slot 22 has mechanical guides 24 for receiving at least one central processing unit card 40, or at least one power supply card 60, or an output/input card as described in greater detail below. The mainframe chassis 20 may be mounted in a standard 19" equipment rack and is designed to accept the various cards into their respective slots 22 from the rear thereof, where all incoming and outgoing electrical connections are made. The mainframe chassis 20 further comprises a backplane 26 proximate the front end thereof that provides a plurality of electrical signal connections between each of the aforementioned circuit board cards of the system 10 in addition to routing various communications signals. While the mainframe chassis 20 may be constructed with enough slots 22 to house widely varying numbers of cards, it is presently contemplated that the chassis 20 have nine input/output card slots, two power supply card slots, and one slot to accommodate a central processing unit.

Figure 3:
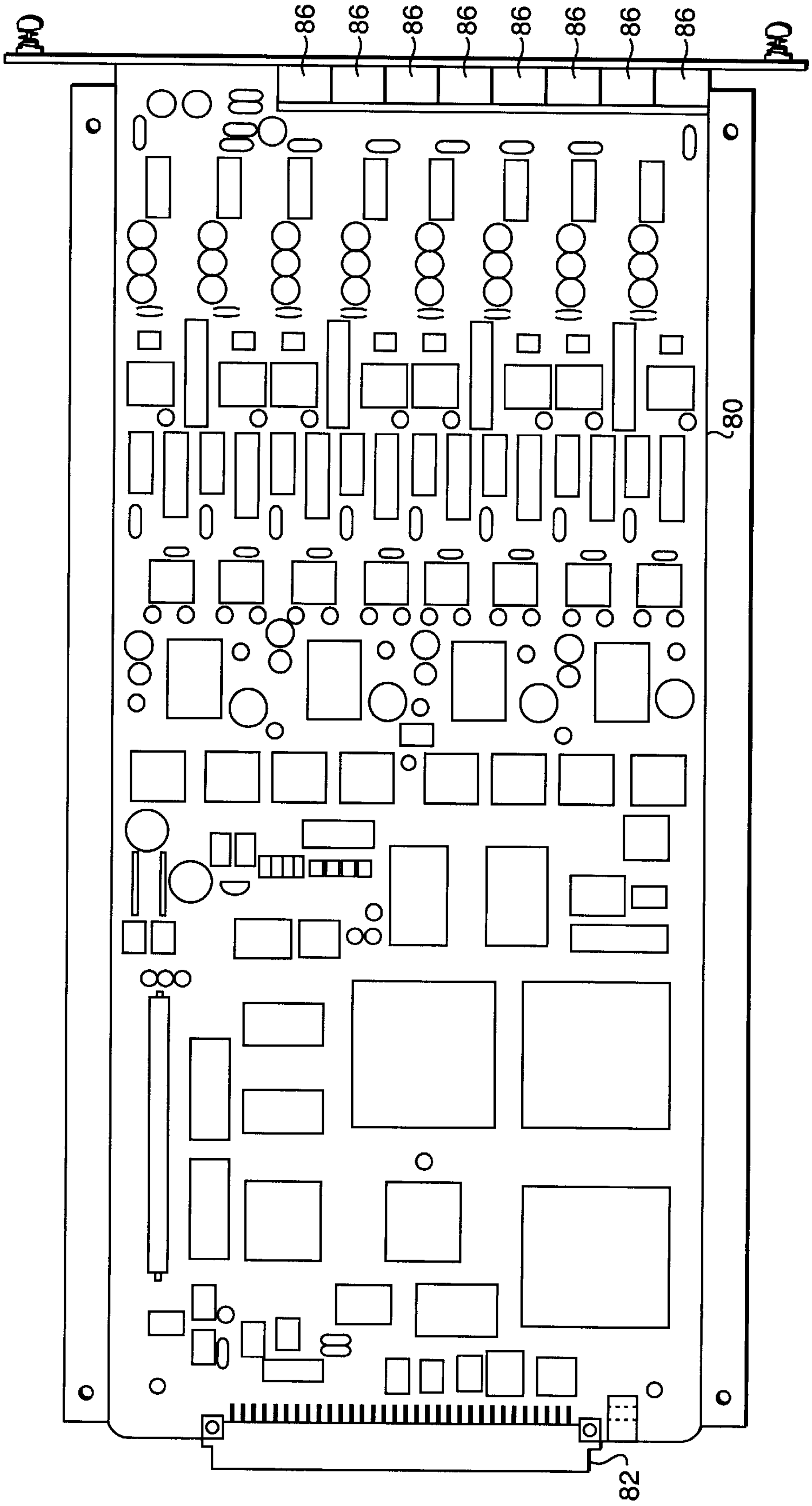
FIG. 3 is a side view of an analog-to-digital card in accordance with the invention.
Figure 4A:
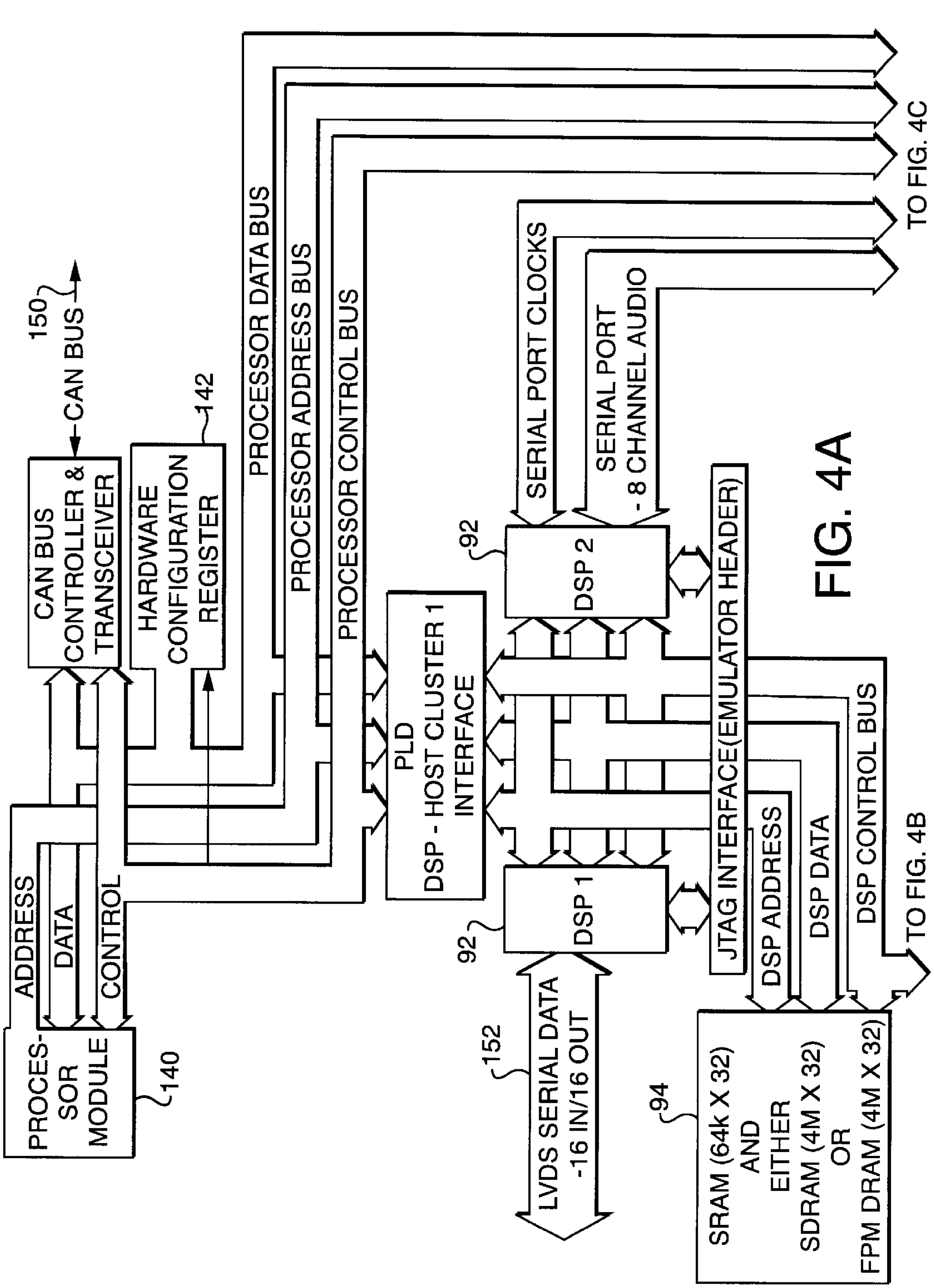
FIG. 4 is a block diagram of an analog-to-digital card in accordance with the invention.
Figure 4B:
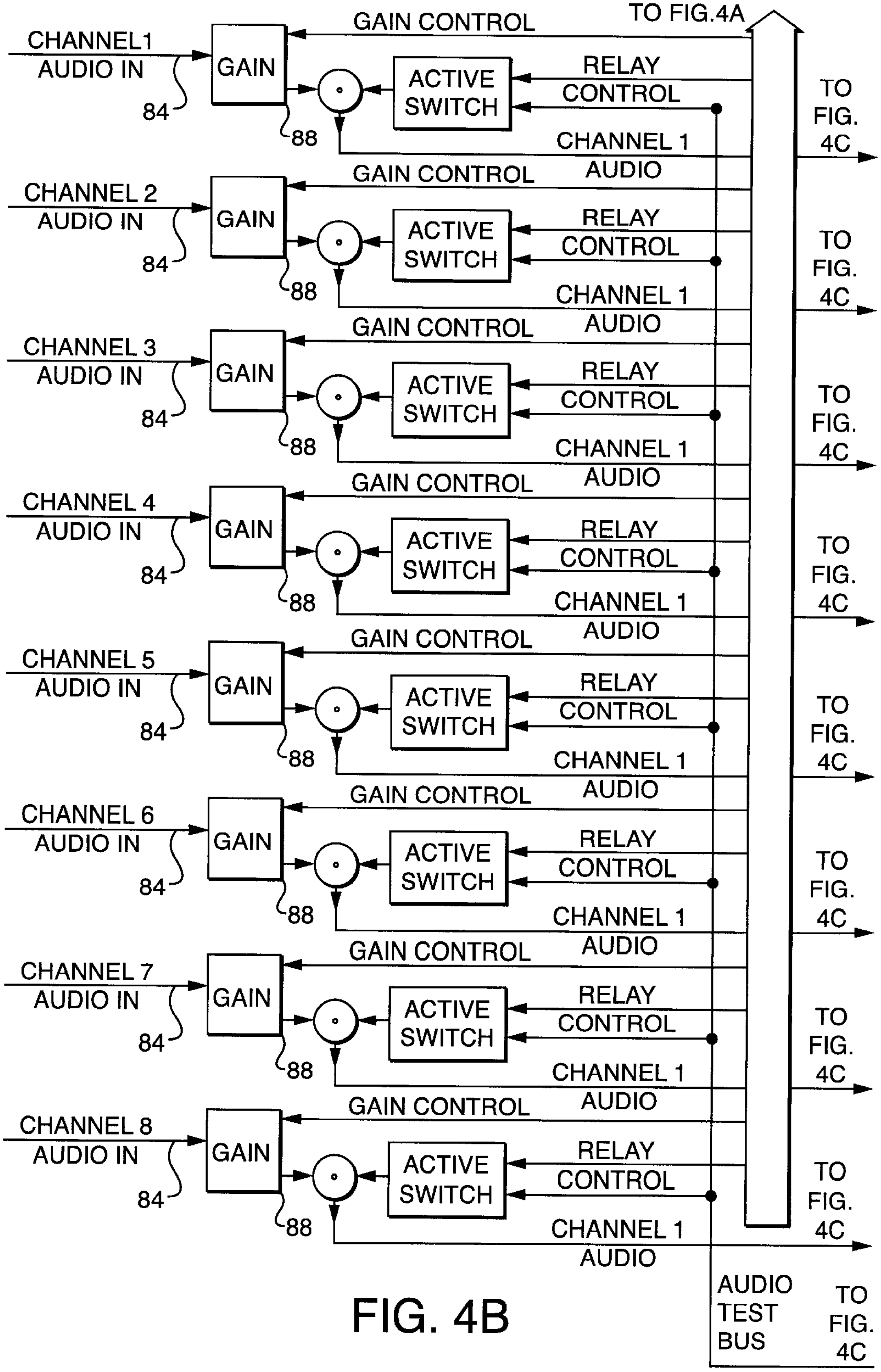
Figure 4C:
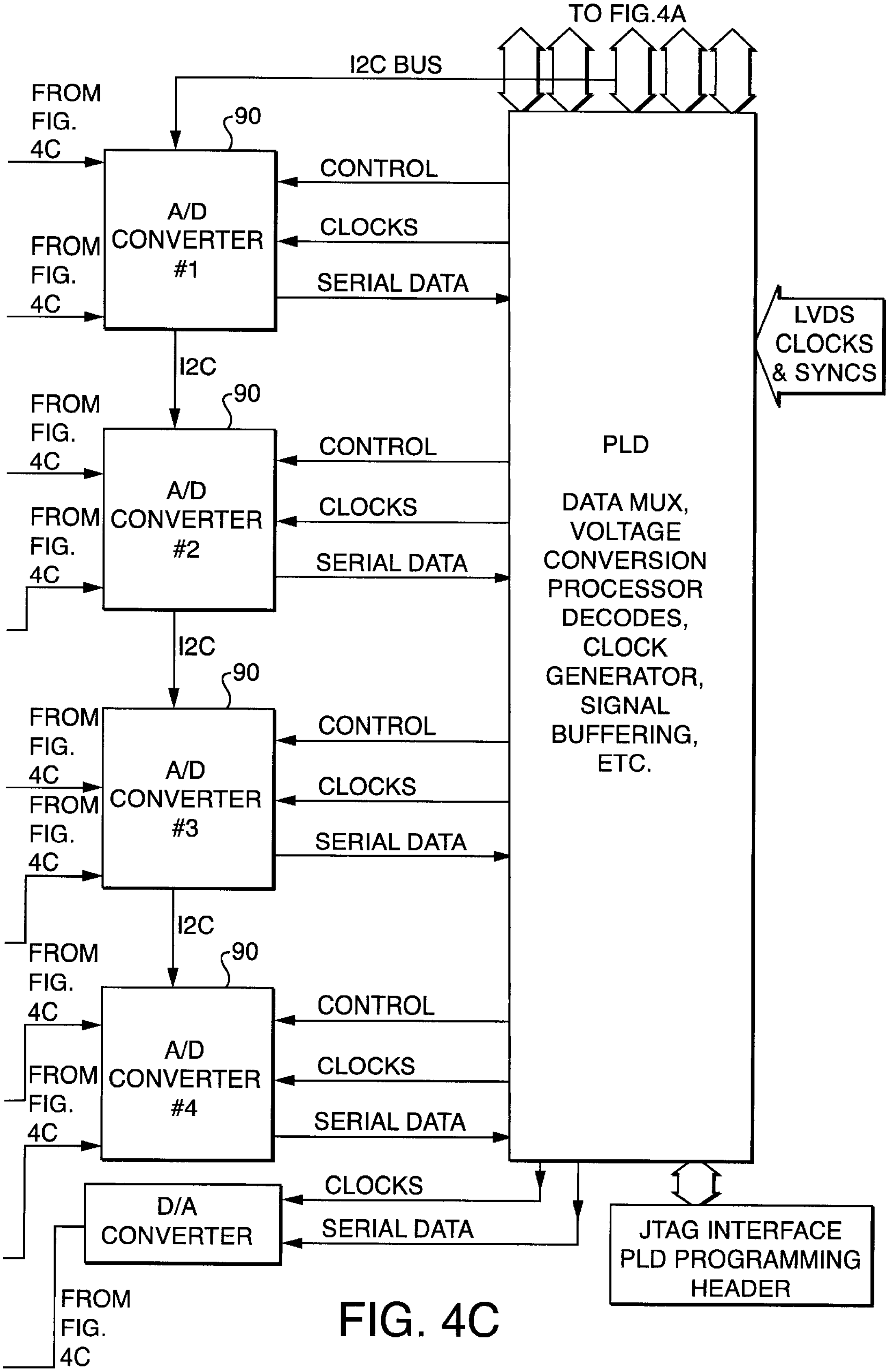

Referring to FIGS. 3 and 4, the signal processing system 10 may include at least one analog input card 80 installed in one of the mainframe chassis slots 22. The analog input card 80 has a male connector 82 thereon that mates with a corresponding female connector 28 provided for each slot 22 in the chassis 20. The mating male connector 82 and female connector 28 provide for a plurality of electrical connections to and from the input card 80 to the backplane 26 of the chassis 20 whereby a plurality of electrical signals are routed to and from the various components of the system 10, as will be explained in greater detail below.

The analog input cards 80 are conventional printed circuit boards having the male connector 82 positioned proximate a first end thereof, and a plurality of audio input channels 84 located proximate a second end thereof. Each input channel 84 is equipped with a screw-type terminal connection 86 so that a plurality of audio inputs from microphones or line sources may be field wired to the plurality of audio input channels 84 proximate the second end of the analog input card 80.

Each analog input channel 84 is capable of accepting an analog audio input having a maximum input level of +34 dBu. The input signal level is software configurable for each analog input channel 84 on a given analog input card 80. Each analog input channel 84 further comprises an adjustable gain control and a preamplifier stage 88 configurable between line and microphone input levels to permit the analog input card 80 to accept a variety of audio inputs. A plurality of conventional analog-to-digital converters 90 are provided on the input card 80 to accept a plurality of analog input signals 84 after gain compensation and perform 24 bit analog to digital conversion with 128× oversampling. The analog to digital converters 90 may also perform anti-alias filtering prior to converting the data to a serial data stream. An adjustable data rate clock signal is provided via the backplane 26 to the analog input card 80 to enable synchronization of the data sampling and the serial data stream produced by the input card 80. Each analog input card 80 includes a plurality of digital signal processors 92 to permit on-board processing of the serial data stream.

Figure 5:
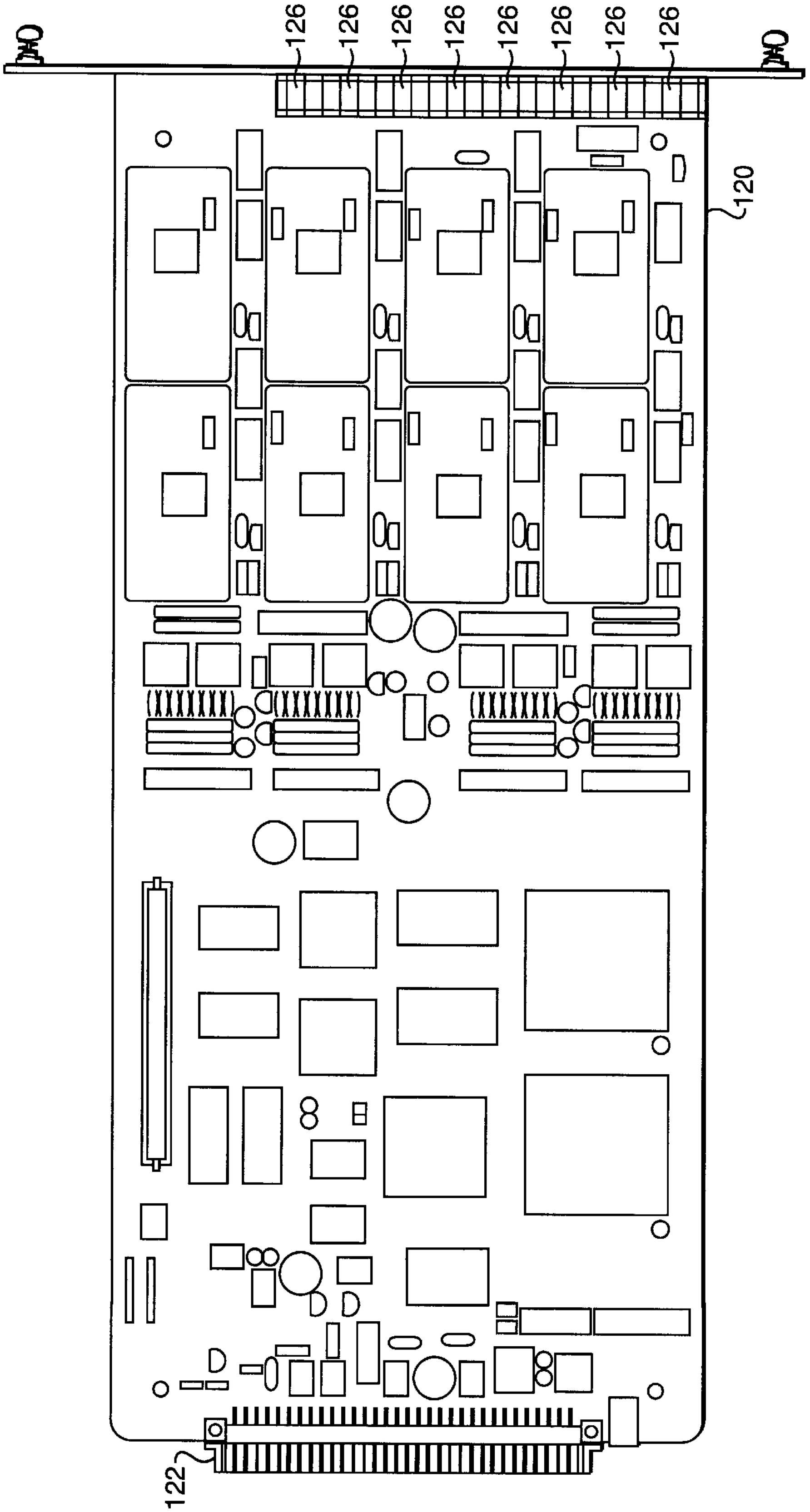
FIG. 5 is a side view of a digital-to-analog card in accordance with the invention.
Figure 6A:
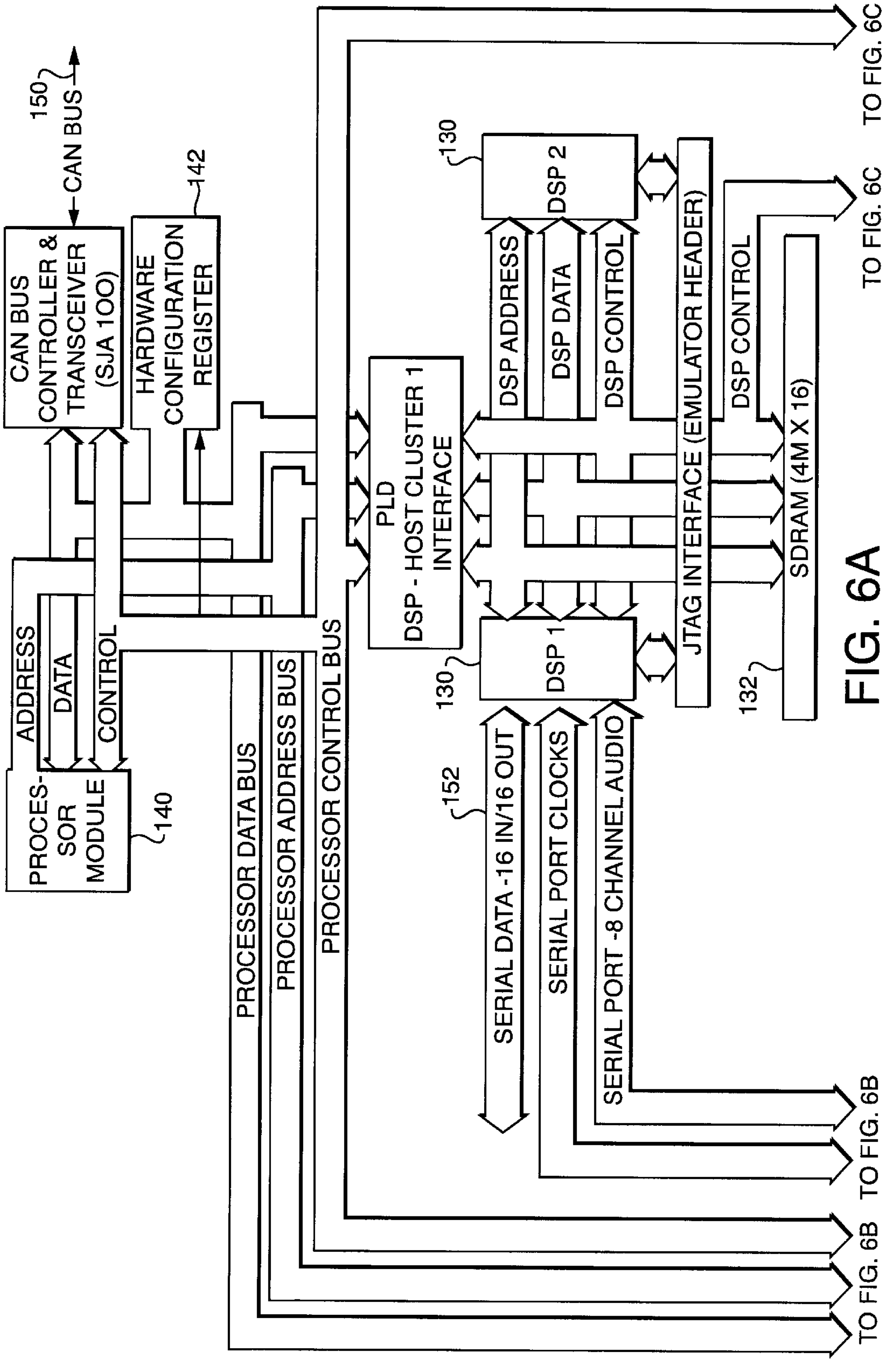
FIG. 6 is a block diagram of a digital-to-analog card in accordance with the invention.
Figure 6B:
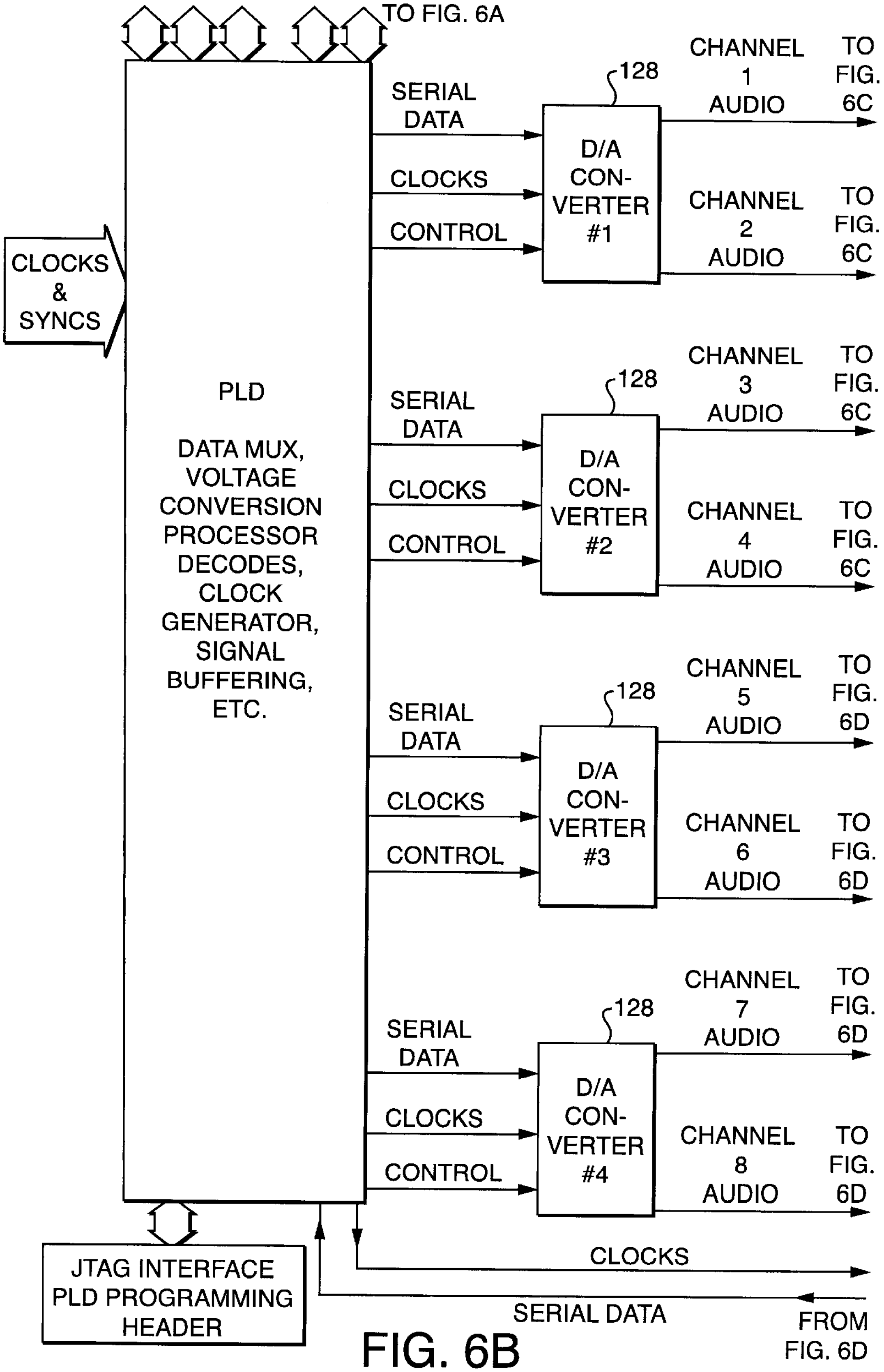
Figure 6C:
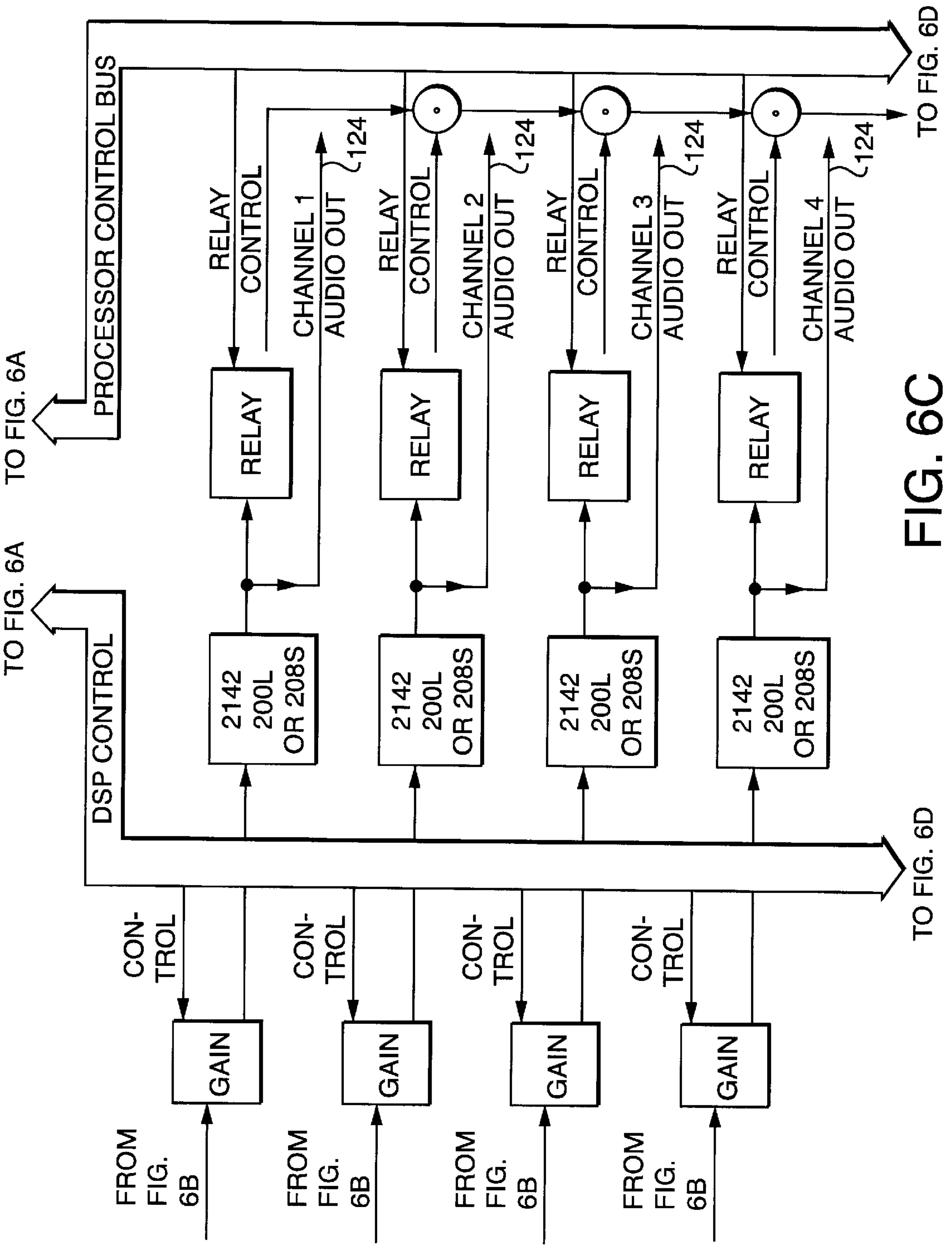
Figure 6D:
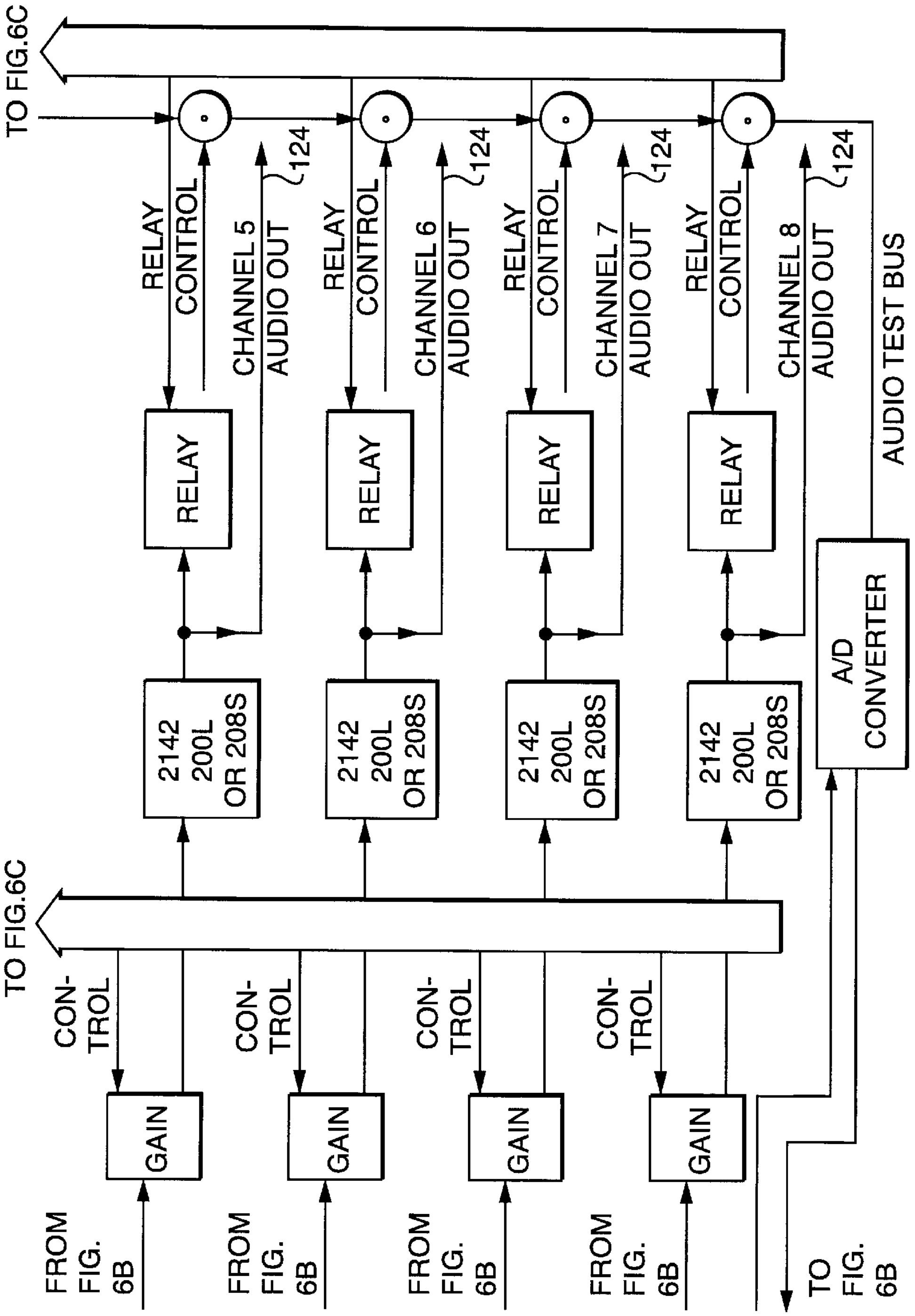

Referring now to FIGS. 5 and 6, the signal processing system 10 may further include at least one analog output card 120 installed in one of the mainframe chassis slots 22. The analog output card 120 also has a male connector 122 thereon that mates with the corresponding female connector 28 provided for each slot 22 in the chassis 20. The male connector 122 provides a plurality of electrical connections to and from the output card 120 to the backplane 26 of the chassis 20.

The analog output cards 120 are printed circuit boards known to one of ordinary skill in the art having the male connector 122 positioned proximate a first end thereof, and a plurality of audio output channels 124 located proximate a second end thereof. Each output channel 124 is equipped with a screw-type terminal connection 126 so that a plurality of loudspeakers or other field devices such as amplifiers or mixers may be field wired to the plurality of audio output channels 124 near the second end of the analog output card 120. Each analog output card 120 employs a plurality of 24 bit digital to analog converters 128 to convert a serial data stream driven by an adjustable data clock to a plurality of low noise, low distortion analog audio outputs 124. The analog outputs 124 provided on each output card 120 may be standard line level outputs, line driver outputs, or alternatively 8-watt amplifier outputs depending upon the required application. In the line driver output embodiment of the instant invention, the analog output card 120 employs an on-board active output module, such as that described in U.S. Pat. No. 4,571,554 to Martin et al., presently assigned to Innovative Electronic Designs, Inc. to allow each output to drive up to 20,000 feet of shielded twisted pair audio cable. These three different analog to digital card embodiments permit a user to configure the system 10 such that a microphone may be connected to an input channel 84, and a speaker may be connected to an output channel 124, without the necessity of pre-amplification stages or additional hardware to drive the speakers. Furthermore, each analog output card 120 further has a plurality of digital signal processors 130 to permit on-board processing of the digital data stream prior to the analog conversion thereof, as will be explained in greater detail below.

Figure 7:
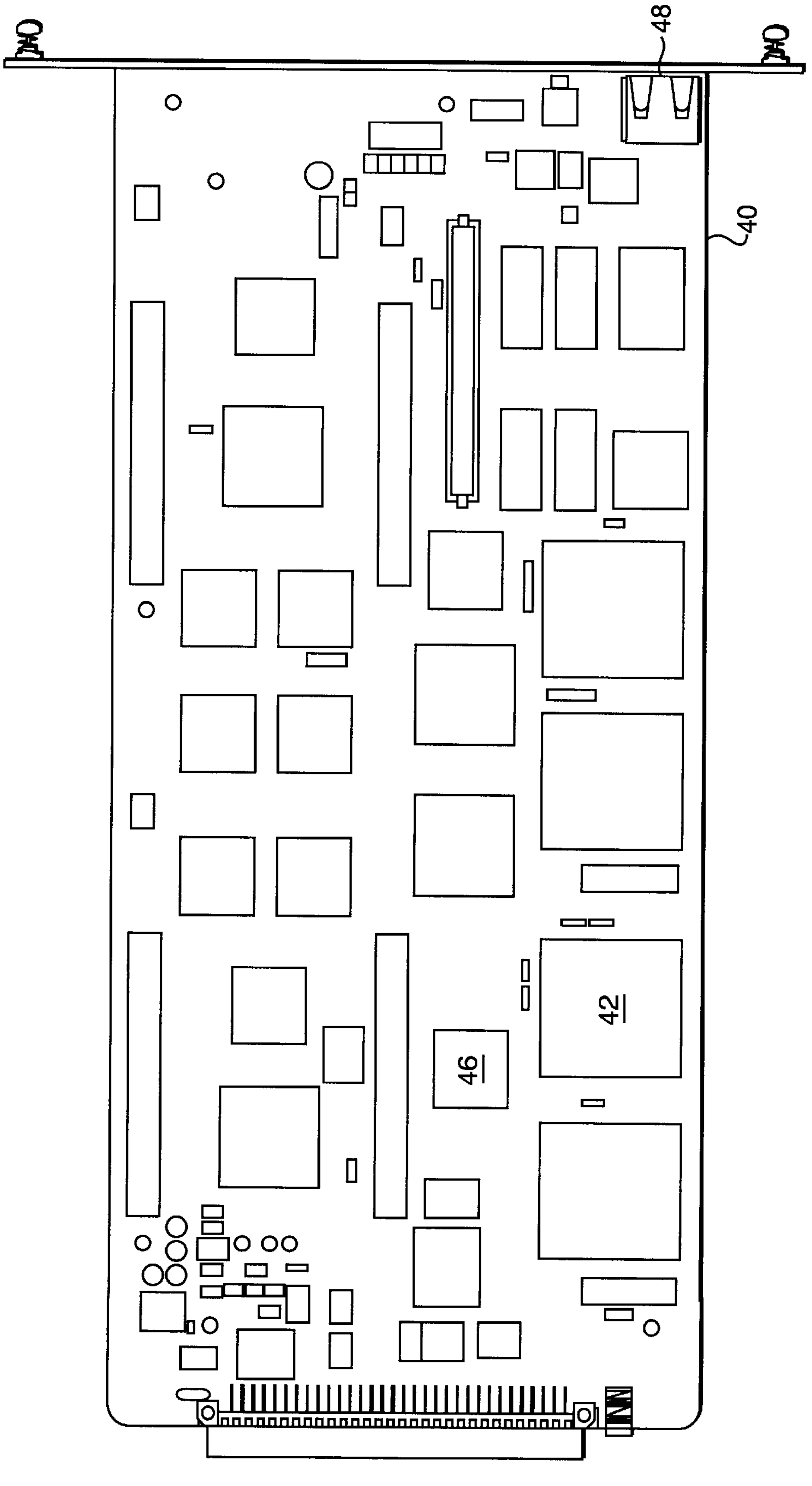
FIG. 7 is a side view of a central processor card in accordance with the invention.
Figure 8A:
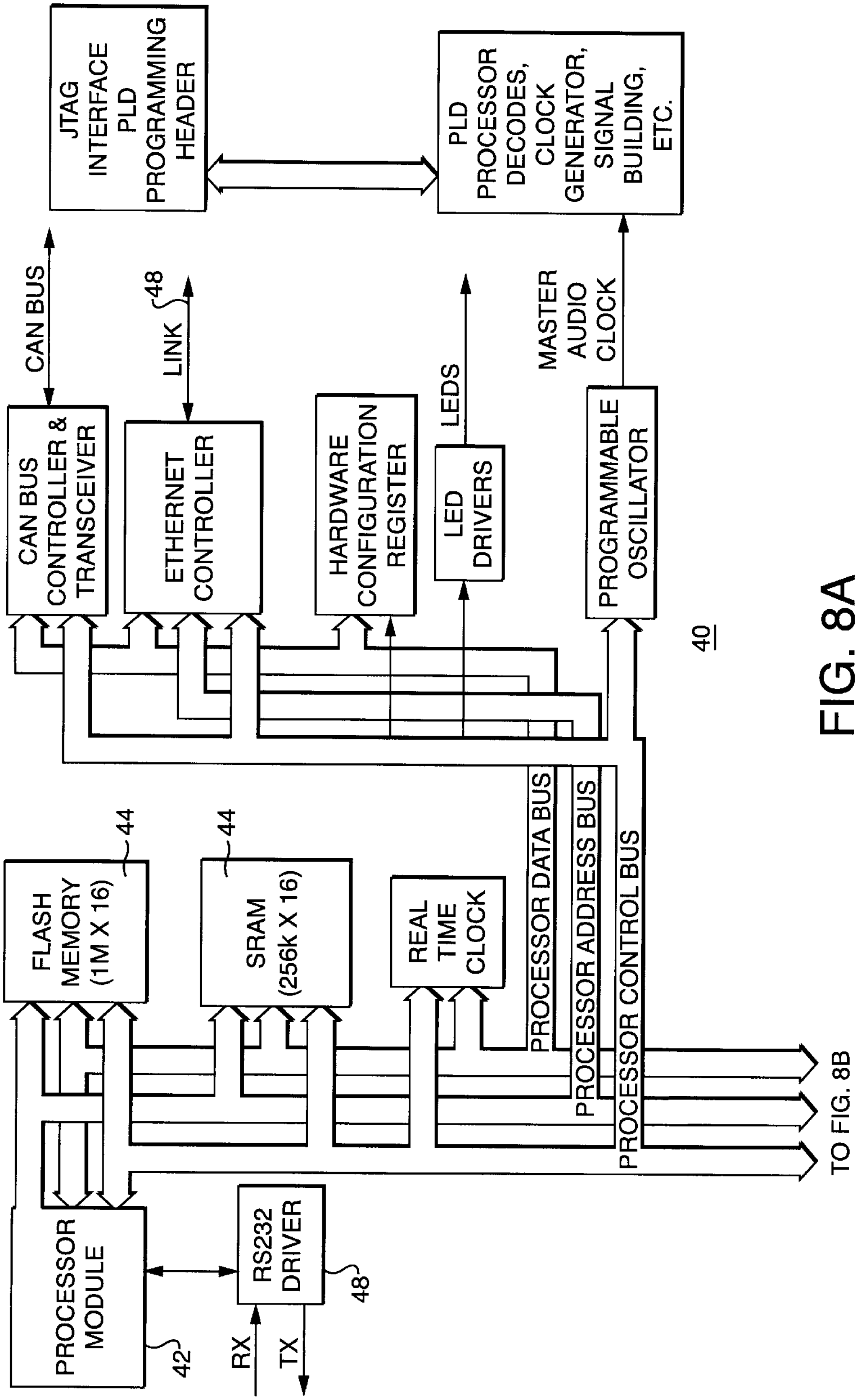
FIG. 8 is a block diagram of a central processor card in accordance with the invention.
Figure 8B:
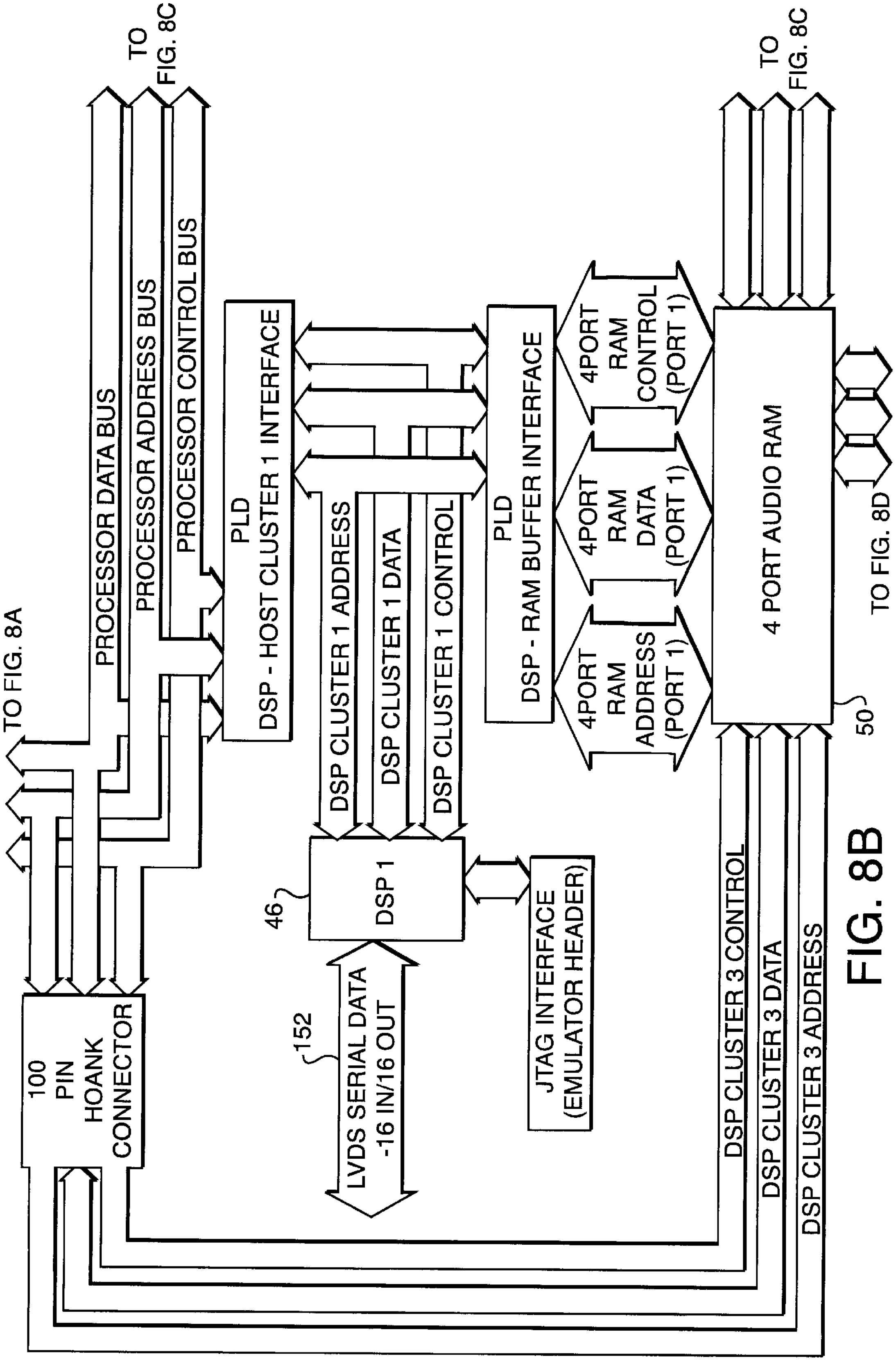
Figure 8C:
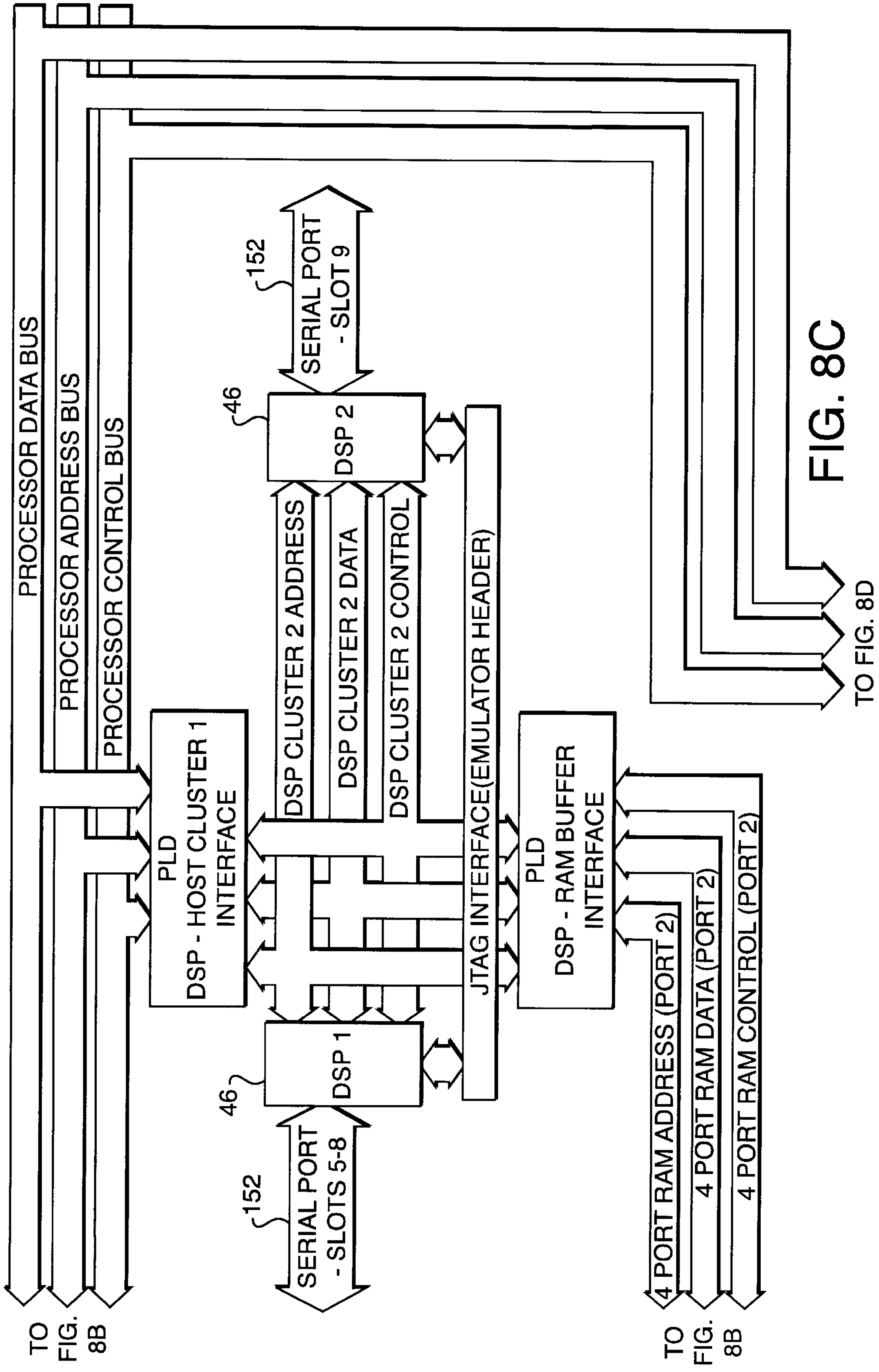
Figure 8D:
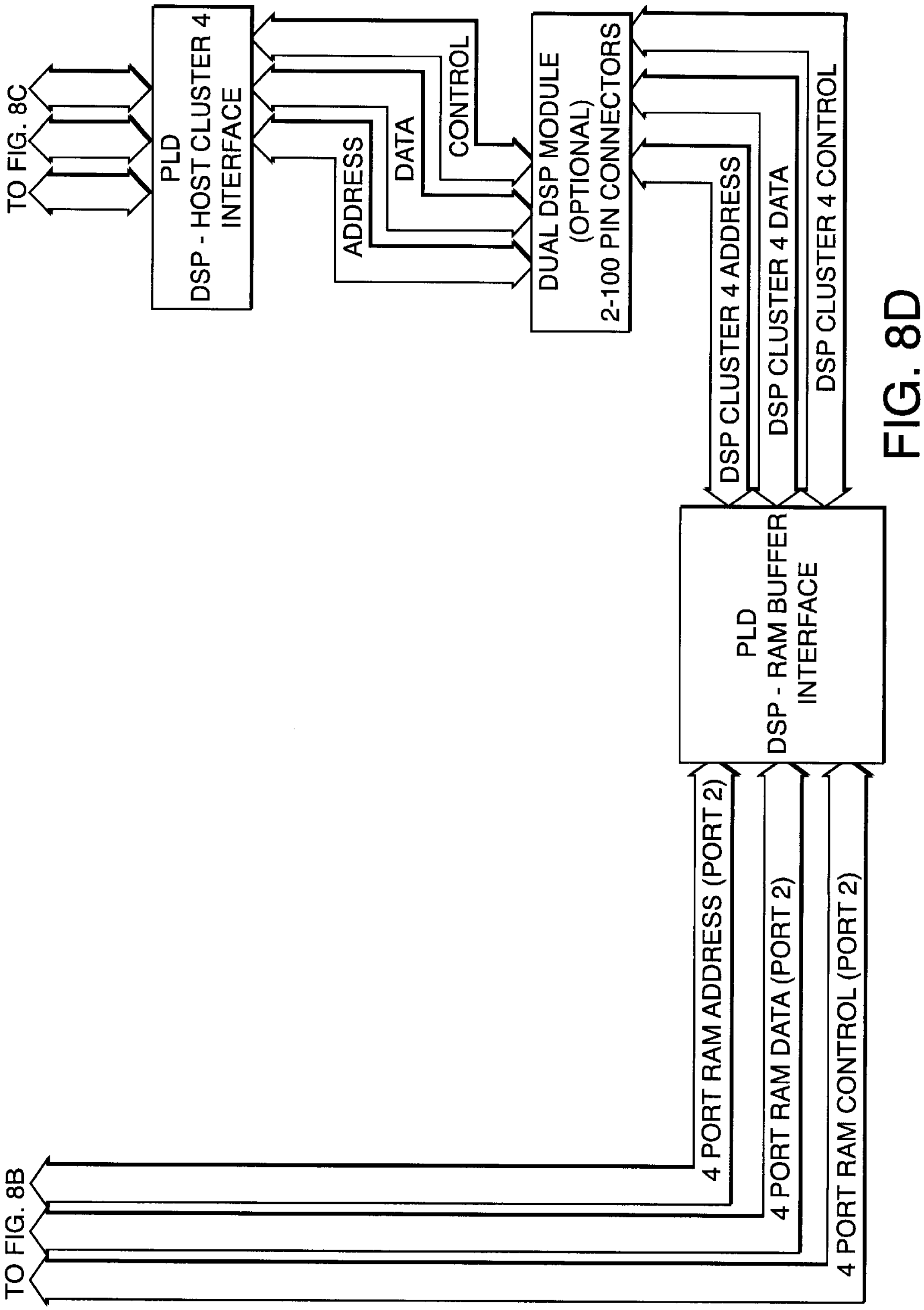

The signal processing system 10 also includes a central processor card 40 having conventional printed circuit board construction, as shown in FIGS. 7 and 8. The central processor card 40 has a central microprocessor 42 thereon and associated memory 44 for controlling system 10 functions and coordinating addressing and data routing throughout the system 10. The central processor card 40 is equipped with a plurality of dual digital signal processor modules 46 (DSP's) that perform multiple digital signal processing tasks such as mixing, automatic mixing, gain control, signal combining, signal compression, equalization, crossover functions, signal delays and signal metering tools.

The central processor card 40 controls the routing and addressing of all signals on the chassis 20 backplane 26. The central processor card 40 is further equipped with Ethernet and RS 232 ports 48, enabling external communication with remote devices, such as personal computers or other graphical operator interfaces. Furthermore, the central processor card 40 may be equipped with a digital data communications port 49 thereby enabling a central processor card 40 to communicate directly to another central processor card 40.

The central processor card 40 accepts downloaded system management and control software into it's memory 44 as programmed on and supplied by a conventional personal computer or other graphical operator interface via the Ethernet port 40. The control software enables a user to configure all signal processing functions throughout the system 10 by providing both data and executable instructions to the central processor card 40. The instructions include the configuration of all cards installed in the system 10, and provide for complete control of all audio input 84 processing through the audio input cards 80, all audio output 124 processing through the audio output cards 120, control of all audio signal routing from inputs to outputs, and enable communication with an operator interface (PC) for further system 10 configuration.

A plurality of digital signal processors 46 (DSP's), on the central processor card 40 communicates with associated multi-port random access memory 50 resident on the central processor card 40. The DSP's 46 perform all signal processing instructions as defined by the program instructions as well as read and write all necessary signal processing data to and from the multi-port memory 50. The DSP's 46 are only permitted to read and/or write data to the multi-port memory 50 one at a time. Once a first DSP 46 begins accessing the multi-port memory 50 it locks out all other DSP's until it is finished with its read/write operation. The central processor card 40 transmits system 10 configuration data, address data, and control data between all other system cards and their associated microprocessors using a controller area network bus (CAN bus) and further transmits shared data via a communication bus dedicated to all digital signal processors 92 and 130 in the system 10.

Both the analog to digital input cards 80 and the digital to analog output cards 120 include on-board microprocessor modules 140 having associated memory 142 that communicate to the central processor card 40 using a first dedicated communications bus 150 through the backplane 26. The communications bus 150 transmits all data, address and control signals directly to and from all the microprocessors 140 and 42 throughout the system 10 both on the central processor card 40 and the input and output cards thereby promoting rapid, efficient signal processing throughout.

Furthermore, each analog to digital input card 80 and each digital to analog output card 120 include on-board random-access memory 94 and 132 respectively, that may be accessed by the DSP's 92 and 130. This feature of the invention permits a portion of the digital signal processing performed by the system 10 to be accomplished on the individual input and output cards, thereby providing enhanced system efficiency and reduced throughput times.

Each input card 80 and output card 120 digital signal processor 92 and 130 communicates with both the on-board (on-card) microprocessor 140 and with all other digital signal processors 92, 130 and 46 in the system 10 via the backplane 26. The digital signal processors communicate with each other throughout the entire system 10 utilizing a second dedicated communications bus 152 on the backplane 26, thereby permitting system signal processing data to be stored in the multi-port random access memory 50 on the central processor card 40 that is then accessible to all digital signal processors thereon. This feature of the instant invention provides for rapid throughput of all signal data, from input to output.

The system 10 of the instant invention further comprises a plurality of power supply cards 60 installed in a plurality of chassis slots 22. The power supply cards 60 accept 110 volts AC power (or 220 AC) from a conventional source such as a wall outlet, and rectify the AC power to DC power for use by the other installed cards and their associated electronic components, as is well known to one of ordinary skill in the art. Both the analog to digital cards 80 and the digital to analog cards 120 are typically supplied with 5 and 3.3 VDC power produced by a one of the power supplies 60 and transmitted via the backplane 26. Additionally, the power supply cards 60 may produce a plurality of DC voltages for use by the central processor card 40 and it's associated components. Furthermore, analog output cards 120 are additionally supplied with +/−15 VDC power produced by a one of the power supplies 60.

The central processor card 40 of the present invention produces a plurality of clock signals and transmits said signals down the backplane 26 for use by the input and output cards 120 to synchronize the transmission and reception of data throughout the entire system 10. A master clock signal is produced by the central processor card 40 that is the highest speed clock signal in the system 10, and is used as a baseline clock signal for all others. A master synch clock signal is also produced that is high (on) for one pulse width, thence low (off) for the remaining pulse widths of an entire frame (one complete sample time) from the master clock. The purpose of the master synch clock is to indicate the beginning of a frame of data to the rest of the system 10 for purposes of sychronization of digital signal processing tasks and transmission and reception of all system data via the plurality of communications busses.

A serial data clock signal, completely separate and distinct from the master clock signal, is generated and supplied to each input and output card via the backplane 26. The serial data clock signal is used to synchronize the operation of the various DSP's throughout the system 10 to the serial data stream without requiring input from the master clock. In an analogous fashion to the master synch clock, a serial data frame synch clock signal is also produced that utilizes a single high pulse for each data frame to provide a positive indication of the beginning of each data frame thereby allowing individual DSP's to place data into the communication stream at the proper time.

The present invention further provides an audio processing system 10 having complete separation of analog and digital signals throughout. The analog input signals and analog output signals are kept physically separate from all digital domain signals in the system 10 by routing the analog inputs and outputs only in the rear of the mainframe chassis 20. The analog inputs 84 are wired into the system 10 via the screw terminals 86 on the analog input card 80. The input card 80 provides an analog ground plane for the analog signals on the card that extends only to one end thereof, (the analog 'end'), thereby physically limiting the analog input signals from contact with any digital signals. A digital end of the card, opposite the analog end thereof, has a separate digital ground plane that is connected to the analog ground plane at a single point on the A/D converters 90. This feature of the invention permits the operation of a very-low noise digital audio processing system 10.

The analog output cards 120 are similarly constructed, having an analog ground plane that extends for only the analog output end of the card 120 and that is connected to a digital ground plane only at a single point on the D/A converters 128. Accordingly, both the input and output cards have 'front' sections that handle only digital signals that are thereby transmitted to other components of the system via the backplane 26. The backplane 26 of the system is located in the front of the mainframe chassis 20, thereby providing both physical and electrical separation from the aforementioned analog signals. Accordingly, the system 10 of the instant invention obviates undesirable cross-talk and is extremely electrically quiet.

The digital signal processors 46,92, and 130, both on the central processor card 40 and on the analog input cards 80 and output cards 120 each process a plurality of software objects as required by the software downloaded from a user interface. For example, a user may program a variety of signal processing objects such as compressors, mixers, parametric equalizers, limiters and the like. Furthermore, multiple processing objects may be programmed to operate on a single input or inputs, thereby requiring digital signal processors to share data between themselves in order to process their respective software objects and produce data outputs.

In order to produce system 10 outputs with minimum propagation delays and efficiently utilize the parallel processing capabilities inherent in a multiple digital signal processor system, the present invention employs a page-swapping memory processing technique for handling signal data. The multi-port memory 50 and the SRAM memory 94 and 132 (or other commercially available read/write memory) on the input 80 and output cards 120 are segregated into two sections or pages, each of which represent the same data addresses or nodes. All data being read from memory(50, 94, 132) is read from a first page, while all data written to memory is written to a second page. At the end of each sample time the first and second pages are swapped so that the data that was being written in the previous sample time will be read during the following processing time.

Figure 9:
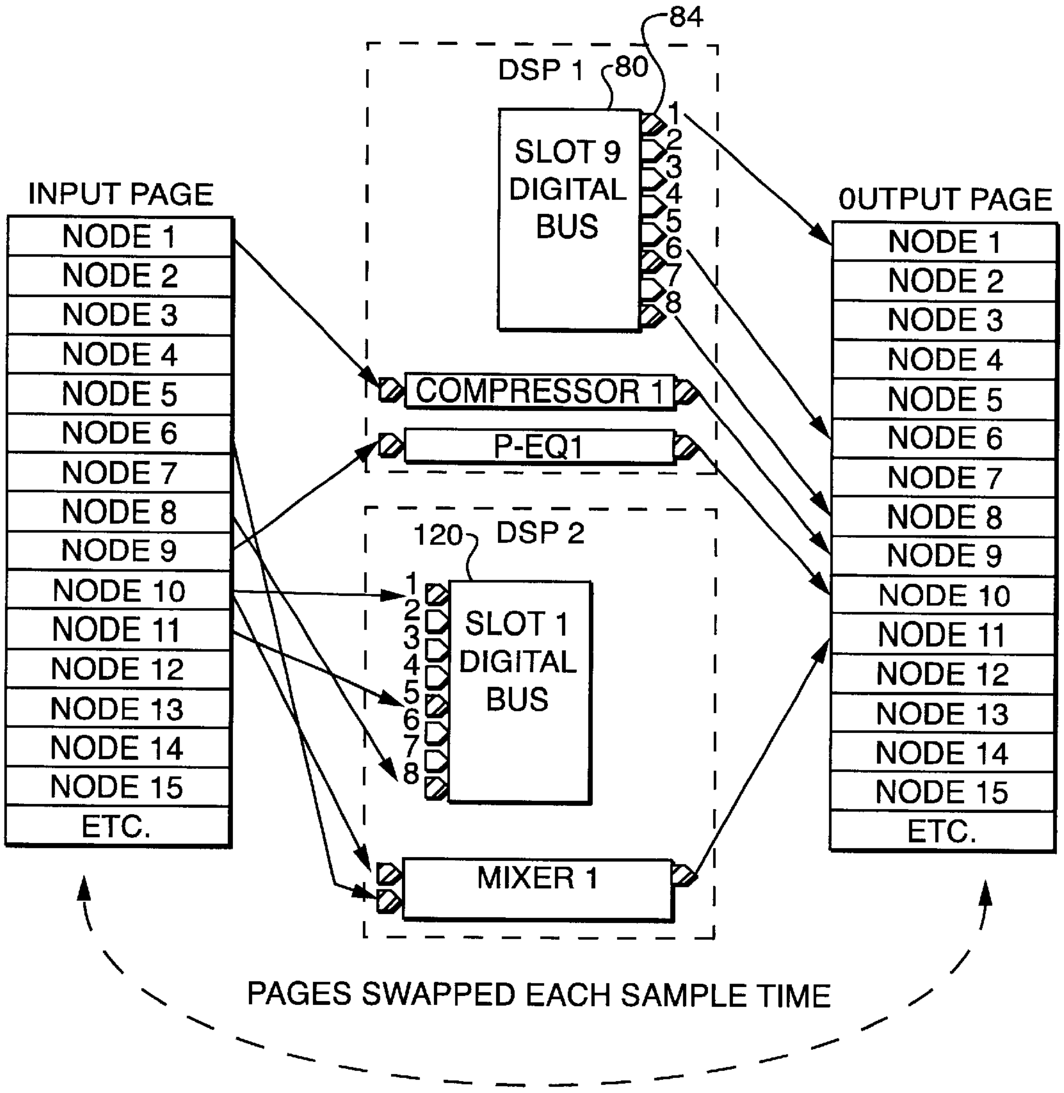
FIG. 9 is a diagram representative of the memory page swapping technique in accordance with the invention.

An example of the page-swapping technique is shown at FIG. 9, wherein a digital signal processor (DSP 1) during a first sample time reads data from an analog input card's 80 analog input channel 84 and writes the incoming data (already converted to a digital representation) to its assigned memory location or node on the 'output' page of the multi-port memory 50, which is divided into input and output pages. DSP 1 next reads the data from node 1 on the input page, processes it through the programmed software compressor, and writes the result of that process to node location 9 on the output page. Finally, DSP 1 reads the data from node 9 on the input page, processes it through a parametric equalizer software object, and writes the result in node location 10 on the output page. During the same sample time, DSP 2 reads the data from node locations 10, 11 and 8, respectively, then writes the data to the analog output card in slot 1, output channels 1, 5, and 8, respectively. DSP 2 next reads the data samples from node locations 10 and 6, processes them through a digital mixer software object, and writes the result to node location 11.

At the end of the sample period detailed above, the input and output memory pages are swapped to allow the results of the previous sample time written in the output page to be used as data on the input page for the subsequent sample time, and vice-versa. Where one DSP is writing data to a node location that will be accessed by another DSP, it is inconsequential whether the data is written before or after it must be accessed by the second DSP, since the data being accessed by the second DSP was written during the previous sample time.

The page-swapping data handling detailed herein above requires that each DSP process all its software objects during each sample time in order for there to be valid data to be operated upon in the subsequent sample when the input and output pages are swapped. This feature of the instant invention produces minimal propagation delays through the system 10 and permits parallel processing among the DSP's to allow for very large user programmed software objects to be rapidly and efficiently processed.

Figure 10:
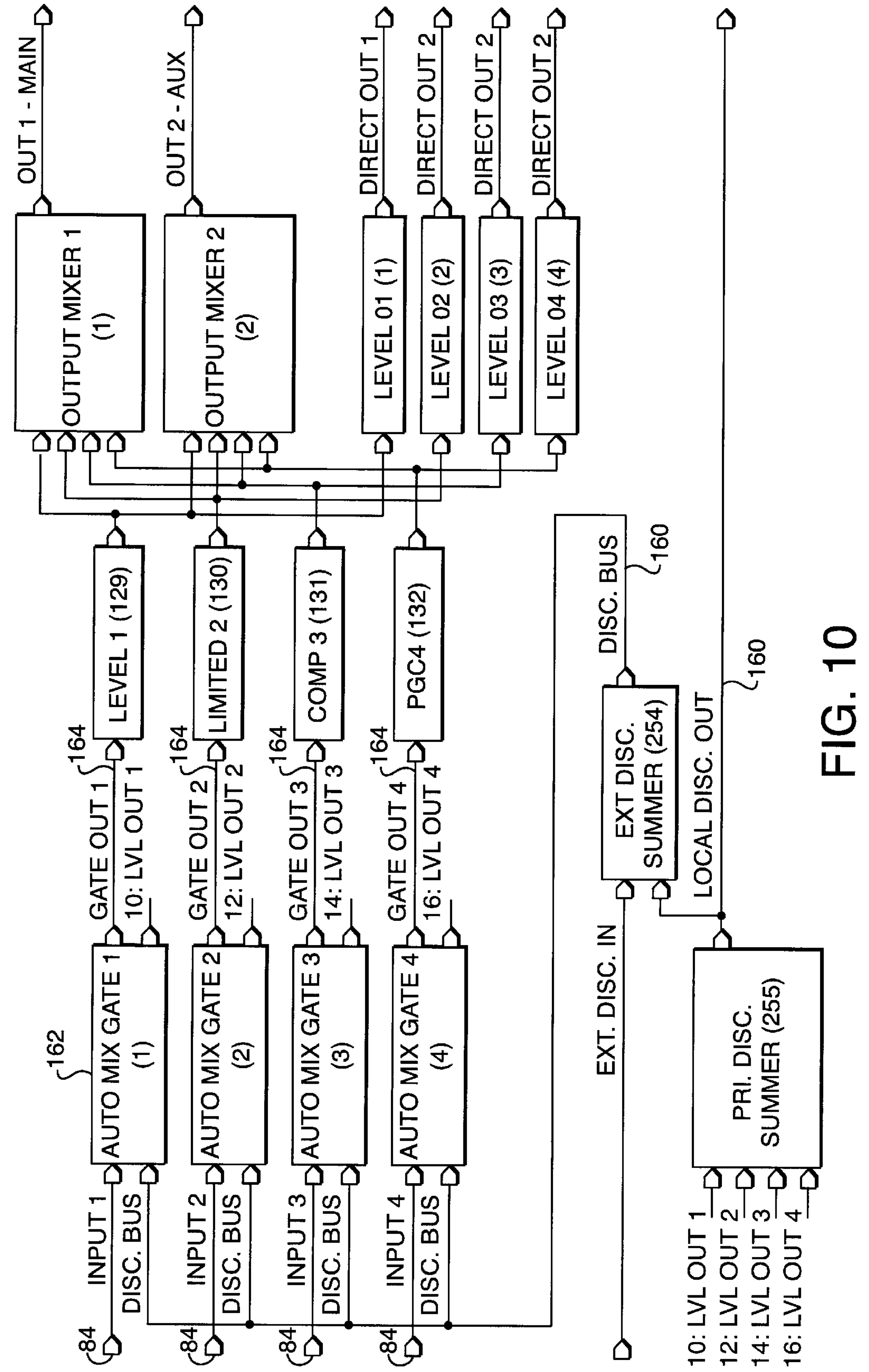
FIG. 10 is an example of signal flow through one embodiment of the instant invention.
Figure 11:
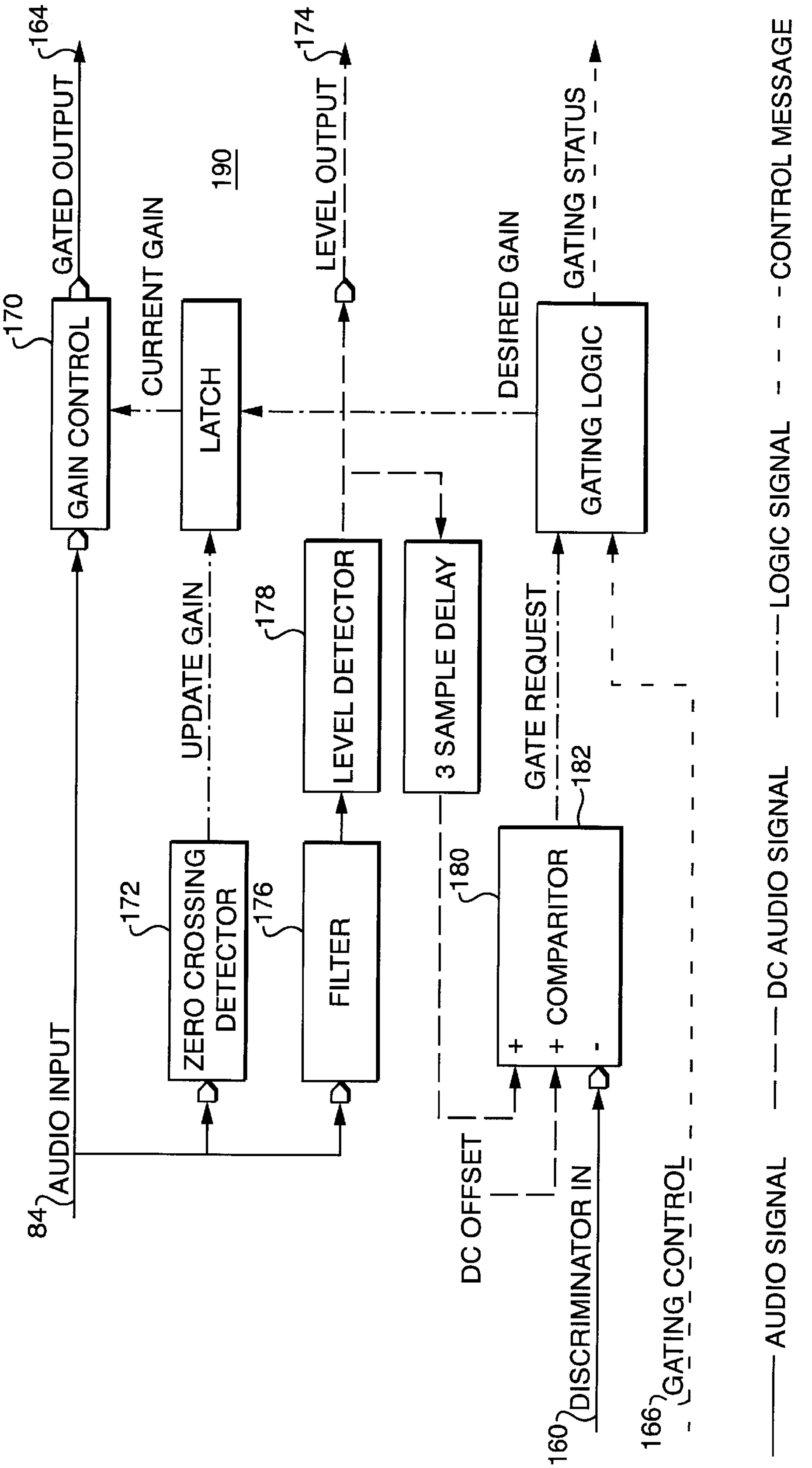
FIG. 11 is a block diagram of input gating logic in accordance with one embodiment of the invention.

Referring now to FIGS. 10 and 11, the system 10 may further include a programmed software object (for example an automatic mixer as shown in FIG. 10) processed by a DSP 92 to make a decision to gate on an specific audio input responsive to the number of input channel 84 signals present in the system 10 at any given time. An automatic mixer is simply a software object that is processed by a selected DSP 92,130 that produces a mixed audio (analog) output from a plurality of audio inputs. The mixer object uses a local discriminator signal 160 that is a summation of the level values of all audio inputs 84 present in the system. The local discriminator signal 160 is then compared to each input signal 84 separately in a mixer gate 162 to determine whether to gate each separate input 84 on. If the level of any individual input 84 is greater than the local discriminator output signal 160, then the input 84 is gated on and a gated output 164 is produced for further (optional) processing within the system 10. Each gated output 164 is then mixed with any other gated outputs 164, i.e. inputs 84 that are gated on. Since any inputs 84 that are not gated on produce a digital 0 at their gated output 164, there is no noise contributed to the resultant system output, unlike in prior art analog mixers.

FIG. 11 illustrates the gating logic 190 that is required to produce the gated output 164 discussed above. In addition to the input signal 84 and gated output 164 produced by the gating logic, the microprocessor 140 resident on the input card 80 may produce a gating control signal 166 to configure the gating logic instructions and also receive gating status messages back therefrom. The gated output signal 164 is generated by a standard gain control software object 170 that has a gain value that is updated each time a zero crossing is detected on the audio input 84 by a zero crossing detector 172. The gating logic 190 produces a gain multiplier having a value of 1 or 0 depending on whether the audio input 84 is gated on (1) or off (0). A level output signal 174 is produced by filtering the input 84, preferably through a second order filter 176, thence passing the filtered signal through a peak-hold level detector 178. The level output signal 174 is then delayed and compared with the discriminator signal 160 in a comparitor 180. Note that a DC offset may be added in the comparitor 180 to prevent inputs from gating on when there is little or no signal present on any given input 84. When the comparison indicates that the input signal 84 is greater than the discriminator signal 160 a gate request signal 182 is produced to request the gating logic 190 to gate the input 84 on. Alternatively, when the comparison indicates that the input signal 84 is less than the value of the discriminator signal 160 an off gate request 182 is produced.

The gating logic 190 is configurable by the user to produce a gain value when it is desirable from a system standpoint to produce a gated output. The gating logic 190 allows a microprocessor 140 on a given input card 80 to look at all system 10 input signals 84 to determine whether user-configured conditions are present to allow a given audio input 84 to gate on. The system 10 of the instant invention permits a user to set a filibuster limit wherein the number of inputs 84 that may be gated on at any one time is set to a predetermined maximum. If this maximum is met, the gating logic 190 sets a gating mode off signal for all other inputs 84, until the number of inputs gated on is reduced. This feature of the invention prevents excessive feedback and noise in the system 10.

Additionally, the microprocessor 140 may determine that all inputs 84 are presently off, and enable them to gate on by setting the gating mode signal on for all inputs. Once a sufficient input signal is received the gating logic 184 turns that input 84 on by setting the gain to 1. The microprocessor 140 then detects that the input 84 is on and communicates this data to the central processing card 40 to compare the number of inputs 84 that are gated on to the pre-configured filibuster limit to determine whether any further inputs 84 may be permitted to gate on. Once no audio signal is detected at a given input 84 for a predetermined amount of time, that input is turned off by the gating logic 190 by setting the gain level for that input 84 to 0.

An additional feature of the system 10 is a configurable number of open microphone (NOM) adjustment that provides for a preset adjustment to the gain of all system 10 audio outputs 124 depending upon the number of inputs 84 present. The NOM adjustment provides a configurable audio output level reduction for each doubling of the number of gated on audio inputs 84. While the gain reduction level may be configured by a user, the optimal output gain reduction is 3 dB for each doubling of gated on inputs 84. This feature of the instant invention prevents the output gain of the system 10 (the effective overall system gain) from increasing when a large number of inputs are gated on, for example in a large conference room setting.

The foregoing detailed description of the preferred embodiments is considered as illustrative only of the principles of the invention. Since the instant invention is susceptible of numerous changes and modifications by those of ordinary skill in the art, the invention is not limited to the exact construction and operation shown and described, and accordingly, all such suitable changes or modifications in structure or operation which may be resorted to are intended to fall within the scope of the claimed invention.

We claim:

1. A system for processing audio signals comprising:

a central processing card having a microprocessor, a system memory, a plurality of digital signal processors, and at least one communications bus connecting said system memory and said digital signal processors for receiving and transmitting data thereon;

at least one analog input card having a microprocessor, a plurality of analog signal input channels, and a communications port for receiving and transmitting data on said at least one communications bus;

at least one analog output card having a microprocessor, a plurality of analog audio output channels, and a communications port for receiving and transmitting data on said at least one communications bus;

a component chassis having a plurality of slots for receiving a plurality of cards and a backplane capable of forming a plurality of electrical connections with said at least one input card, said at least one output card, said central processing card and the at least one communications bus; and wherein all analog input signals to said at least one input card and all analog output signals from said at least one output card are isolated from all digital domain signals in said system.

2. A system for processing audio signals as claimed in claim 1 further comprising:

at least one analog input card having a microprocessor, a plurality of analog signal input channels, a plurality of analog to digital converters for converting the signal inputs into digital data, a plurality of digital signal processors, and a first communications port for receiving and transmitting data on said at least one communications bus; and a second communications bus for transmitting data directly from the digital signal processors of said analog input card to the central processing card digital signal processors.

3. A system for processing audio signals as claimed in claim 1 further comprising:

at least one analog output card having a microprocessor, a plurality of analog output channels, a plurality of digital to analog converters for converting a digital data stream into a plurality of analog outputs, a plurality of digital signal processors, and a first communications port for receiving and transmitting data on said at least one communications bus; and a second communications bus for transmitting data directly from the digital signal processors of said analog output card to the central processing card digital signal processors.

4. A system for processing audio signals as claimed in claim 1 further comprising:

an analog input card having a microprocessor, a plurality of analog signal input channels for accepting a plurality of analog input signals, a plurality of analog to digital converters for converting a signal input into digital data, a plurality of digital signal processors, a first communications port for receiving and transmitting data on said at least one communications bus, a second communications bus for transmitting data directly from the digital signal processors of said analog input card to the central processing card digital signal processors, and a ground plane corresponding to the analog input signals, the ground plane covering a portion of said input card located proximate the analog signal input channels wherein the analog signals present on said input card are electrically and physically isolated from the digital signals present thereon.

5. A system for processing audio signals as claimed in claim 1 further comprising:

an analog output card having a microprocessor, a plurality of analog output channels, a plurality of digital to analog converters for converting a digital data stream into a plurality of analog outputs, a plurality of digital signal processors, a first communications port for receiving and transmitting data on said at least one communications bus, a second communications bus for transmitting data directly from the digital signal processors of said analog output card to the central processing card digital signal processors, and a ground plane corresponding to the analog outputs, the ground plane covering a portion of said output card located proximate the analog output channels wherein the analog signals present on said card are electrically and physically isolated from the digital signals present thereon.

6. A system for processing audio signals comprising:

a central processing card having a microprocessor, a system memory, a plurality of digital signal processors, at least one communications bus connecting said system memory and said digital signal processors, and a multi-port memory for storing data accessible to each of said digital signal processors;

at least one analog input card having a microprocessor, a plurality of signal input channels, and a communications port for receiving and transmitting data on said at least one communications bus;

at least one analog output card having a microprocessor, a plurality of analog audio output channels, and a communications port for receiving and transmitting data on said at least one communications bus;

a component chassis having a plurality of slots for receiving a plurality of cards and a backplane capable of forming a plurality of electrical connections with said at least one input card, said at least one output card, said central processing card and the at least one communications bus; and wherein all analog input signals to said at least one input card and all analog output signals from said at least one output card are isolated from all digital domain signals in said system.

7. A system for processing audio signals comprising:

a central processing card having a microprocessor, a system memory, a plurality of digital signal processors, at least one communications bus connecting said system memory and said digital signal processors, and a multi-port memory for storing data accessible to each of said digital signal processors;

at least one analog input card having a microprocessor, a plurality of signal input channels, and a communications port for receiving and transmitting data on said at least one communications bus;

at least one analog output card having a microprocessor, a plurality of analog audio output channels, and a communications port for receiving and transmitting data on said at least one communications bus;

a component chassis having a plurality of slots for receiving a plurality of cards and a backplane capable of forming a plurality of electrical connections with said at least one input card, said at least one output card, said central processing card and the at least one communications bus; and wherein all analog input signals to said at least one input card and all analog output signals from said at least one output card are isolated from all digital domain signals in said system by routing all analog signals in through said input and output cards and having only digital signals transmitted on said backplane.

8. A system for processing audio signals comprising:

a central processing card having a microprocessor, a system memory, a plurality of digital signal processors, a first communications bus connecting said system memory and the digital signal processors, a multi-port memory for storing data accessible to each of said plurality of digital signal processors, and a second communications bus for transmitting data between the digital signal processors;

at least one analog input card having a microprocessor, a plurality of signal input channels, a communications port for receiving and transmitting data on said first communications bus, at least one digital signal processor for processing audio programming objects, and a second communications port for transmitting data between the at least one digital signal processor and the multi-port memory;

at least one analog output card having a microprocessor, a plurality of analog audio output channels, and a communications port for receiving and transmitting data on said first communications bus at least one digital signal processor for processing audio programming objects, and a second communications port for transmitting data between the at least one digital signal processor and the multi-port memory;

a component chassis having a plurality of slots for receiving a plurality of cards and a backplane capable of forming a plurality of electrical connections with said at least one input card, said at least one output card, said central processing card and the first and second communications busses; and wherein all analog input signals to said at least one input card and all analog output signals from said at least one output card are isolated from all digital domain signals in said system by routing all analog signals in through said input and output cards and having only digital signals transmitted on said backplane.

9. A system for processing audio signals comprising:

a component chassis having a plurality of slots for receiving a plurality of system cards and a backplane capable of forming a plurality of electrical connections with said cards;

a central processing card having a microprocessor, a system memory in communication with the microprocessor via a first communications bus, a plurality of digital signal processors, and a multi-port memory in communication with the digital signal processors via a second communications bus wherein said first and second communications busses extend down the backplane;

at least one analog input card having a microprocessor capable of transmitting and receiving data on the first communications bus, a plurality of analog signal inputs, a plurality of analog to digital converters for producing a digital representation of the analog inputs, at least one digital signal processor for processing software objects capable of transmitting and receiving data on the second communications bus between the at least one digital signal processor and the multi-port memory;

at least one analog output card having a microprocessor capable of transmitting and receiving data on the first communications bus, a plurality of analog outputs, a plurality of digital to analog converters for producing an analog output from a digital signal, at least one digital signal processor for processing software objects capable of transmitting and receiving data on the second communications bus between the at least one digital signal processor and the multi-port memory; and wherein the multi-port memory is partitioned into first and second data segments, the first data segment having data written thereto in a given sample time and the second data segment having data read therefrom in a given sample time and wherein the first and second data segments are swapped at the end of each sample time.

10. A system for processing audio signals comprising:

a component chassis having a plurality of slots for receiving a plurality of system cards and a backplane capable of forming a plurality of electrical connections with said cards;

a central processing card having a microprocessor, a system memory in communication with the microprocessor via a first communications bus, a plurality of digital signal processors, and a multi-port memory in communication with the digital signal processors via a second communications bus wherein said first and second communications busses extend down the backplane;

at least one analog input card having a microprocessor capable of transmitting and receiving data on the first communications bus, a plurality of analog signal inputs, a plurality of analog to digital converters for producing a digital representation of the analog inputs, at least one digital signal processor for processing software objects capable of transmitting and receiving data on the second communications bus between the at least one digital signal processor and the multi-port memory;

at least one analog output card having a microprocessor capable of transmitting and receiving data on the first communications bus, a plurality of analog outputs, a plurality of digital to analog converters for producing an analog output from a digital signal, at least one digital signal processor for processing software objects capable of transmitting and receiving data on the second communications bus between the at least one digital signal processor and the multi-port memory; and wherein the system permits a user to set a predetermined number of analog inputs that may be gated on at any time.

11. A system as claimed in claim 9 wherein the system permits a user to set a predetermined maximum number of analog inputs that may be gated on at any time.

12. A system as claimed in claim 10 wherein an analog input on the at least one analog input card is gated on only when its signal level exceeds the level of a discriminator signal calculated by summing the levels of all analog input signals.

13. A method for processing audio signal data in an audio processing system having a microprocessor and a system memory comprising the steps of:

a) partitioning the memory into two data segments representative of the same data addresses;

b) writing data only to a first of the two data segments;

c) reading data only from a second of the two data segments; and d) swapping the data in the first and second data segments each sampling time of said microprocessor whereby the data in the first and second data segments are simultaneously accessible for parallel processing tasks.

* * * * *